(12) United States Patent
Lonsdorfer et al.

(10) Patent No.: US 9,764,519 B2
(45) Date of Patent: Sep. 19, 2017

(54) DEVICE AND METHOD FOR THE PRODUCTION OF MULTI-ARCHED STRUCTURAL COMPONENTS FROM A FIBER COMPOSITE

(71) Applicant: Airbus Operations GmbH, Hamburg (DE)

(72) Inventors: Georg Lonsdorfer, Stade (DE); Adrian Wachendorf, Söhre (DE); Remo Hinz, Stade (DE); Niels Deschauer, Freiburg (DE); Adam Andrä, Freiburg (DE)

(73) Assignee: Airbus Operations GmbH (DE)

( * ) Notice: Subject to any disclaimer, the term of this patent is extended or adjusted under 35 U.S.C. 154(b) by 841 days.

(21) Appl. No.: 13/628,919

(22) Filed: Sep. 27, 2012

(65) Prior Publication Data
US 2013/0020030 A1    Jan. 24, 2013

Related U.S. Application Data

(63) Continuation of application No. PCT/EP2011/054717, filed on Mar. 28, 2011.
(Continued)

(30) Foreign Application Priority Data

Mar. 30, 2010    (DE) .................. 10 2010 013 478

(51) Int. Cl.
*B29C 33/48*    (2006.01)
*B29C 70/46*    (2006.01)
(Continued)

(52) U.S. Cl.
CPC .......... *B29C 70/462* (2013.01); *B29C 31/008* (2013.01); *B29C 31/085* (2013.01);
(Continued)

(58) Field of Classification Search
CPC ... B29C 31/008; B29C 31/085; B29C 33/485; B29C 70/462; B29L 2031/3082; B64C 2001/0072
(Continued)

(56) References Cited

U.S. PATENT DOCUMENTS 4,177,032 A * 12/1979 Selden et al. ................. 425/468
4,527,783 A * 7/1985 Collora et al. ................. 269/21
(Continued)

FOREIGN PATENT DOCUMENTS

| CN | 101232992 A | 7/2008 |
|---|---|---|
| CN | 101247941 A | 8/2008 |

(Continued)

OTHER PUBLICATIONS

U.S. Appl. No. 13/638,141, filed Sep. 28, 2012.

*Primary Examiner* — William Bell
(74) *Attorney, Agent, or Firm* — Lerner, David, Littenberg, Krumholz & Mentlik, LLP

(57) ABSTRACT

A device for the production of structural components from a fiber composite material, the components being three-dimensionally arched over a large surface, including a jig having a convex mounting surface having receiving channels for the insertion of structural components, wherein the loaded jig interacts with a laminating bonding device having a corresponding shape for forming the structural component under pressure, wherein the mounting surface includes a plurality of individually elastically deformable mounting shell parts arranged adjacent to each other along at least one longitudinally extending pitch line and attached to a plurality of elastically deformable supporting frame elements extending on the interior of the shell at a right angle to the pitch line, and a plurality of actuators for deforming the mounting surface between an extended position (A) and at least one retracted position (B) to move the jig from the
(Continued)

bonding device relative to the receiving channels without undercuts.

9 Claims, 3 Drawing Sheets

Related U.S. Application Data

(60) Provisional application No. 61/318,920, filed on Mar. 30, 2010.

(51) Int. Cl.
*B29C 31/00* (2006.01)
*B29C 31/08* (2006.01)
*B29C 70/34* (2006.01)
*B29L 31/30* (2006.01)

(52) U.S. Cl.
CPC ..... *B29C 33/485* (2013.01); *B29L 2031/3082* (2013.01); *Y02T 50/433* (2013.01); *Y10T 156/1002* (2015.01); *Y10T 156/17* (2015.01)

(58) Field of Classification Search
USPC ..... 156/556, 559, 560, 561, 562; 425/436 R, 425/436 RM, 440, 442, 443; 264/318; 244/120
See application file for complete search history.

(56) References Cited

U.S. PATENT DOCUMENTS

| | | |
|---|---|---|
| 5,217,669 A | 6/1993 | Dublinski et al. |
| 6,245,275 B1* | 6/2001 | Holsinger ............... 264/257 |
| 6,298,896 B1 | 10/2001 | Sherrill et al. |
| 8,534,605 B2 | 9/2013 | Haack |
| 2003/0205334 A1 | 11/2003 | Sherrill et al. |
| 2004/0050498 A1 | 3/2004 | Herrmann et al. |
| 2005/0127566 A1 | 6/2005 | Chotard |
| 2006/0108058 A1* | 5/2006 | Chapman et al. ............ 156/245 |
| 2008/0078876 A1* | 4/2008 | Baggette et al. .......... 244/129.3 |
| 2008/0295755 A1 | 12/2008 | Weimer |
| 2009/0178765 A1 | 7/2009 | Joern et al. |
| 2009/0321569 A1 | 12/2009 | Schroeer et al. |
| 2010/0025532 A1 | 2/2010 | Herrmann et al. |
| 2010/0038487 A1 | 2/2010 | Kolax et al. |
| 2012/0055617 A1 | 3/2012 | Van Vuegt et al. |

FOREIGN PATENT DOCUMENTS

| | | |
|---|---|---|
| CN | 101432189 A | 5/2009 |
| CN | 101448697 A | 6/2009 |
| CN | 101631665 A | 1/2010 |
| CN | 101631716 A | 1/2010 |
| DE | 3605256 C1 | 3/1991 |
| DE | 10230270 A1 | 6/2003 |
| DE | 10331358 A1 | 2/2004 |
| DE | 102007027113 A1 | 12/2008 |
| GB | 1389212 A | 4/1975 |
| GB | 1431927 A | 4/1976 |

* cited by examiner

DEVICE AND METHOD FOR THE PRODUCTION OF MULTI-ARCHED STRUCTURAL COMPONENTS FROM A FIBER COMPOSITE

CROSS-REFERENCE TO RELATED APPLICATIONS

The present application is a continuation of International Application No. PCT/EP2011/054717, filed Mar. 28, 2011, published in German, which claims priority from U.S. Provisional Patent Application No. 61/318,920, filed on Mar. 30, 2010, and German Patent Application No. 10 2010 013 478.3, filed on Mar. 30, 2010, the disclosures of which are incorporated herein by reference.

TECHNICAL FIELD

The present invention relates to a device and a method for the production of in particular doubly arched large-area structural components from a fiber composite material, comprising a jig having a corresponding convex mounting surface which has receiving channels, which are spaced apart from each other and extend at least in longitudinal direction, for the insertion of construction components, in particular stringers, and which can be loaded with auxiliary materials, wherein the loaded jig interacts with a laminating bonding device having a corresponding shape for forming the structural component under pressure.

The field of application of the present invention predominantly relates to aircraft construction. In particular, wide-bodied commercial aircraft or transport aircraft can be constructed in a shell construction, in particular a semi-shell construction. In aircraft construction the term "semi-shell construction" relates to the design of the fuselage, mostly in two shells. When joined, the two shells result in an almost circular or oval cross section of a fuselage segment. A plurality of fuselage segments, arranged in line, for the rear end, the middle of the fuselage, and the cockpit section, result in the entire aircraft fuselage. Increasingly, in the production of aircraft fuselages, suitable fiber composite materials such as glass-fiber-reinforced or carbon-fiber-reinforced plastics are used. In order to stiffen the fuselage so that it can take up the expected loads, the shells usually comprise stiffening members, in particular stringers and braces.

In the production principle of interest in the present document, the shell-like structural component is produced in a negative adhesive mold, in a so-called laminating bonding device (LKV) in that various layers of fiber material and resin are placed in said location and are cured. In this arrangement the laminating bonding device interacts with a jig (ARV), which is used for preparing the layer design of the skin layers apart from positioning the construction components, for example, in particular, stringers, window frames, door frames and the like, bonded into the layer design. Lastly, the laminating bonding device defines the corresponding external contour and ensures a smooth external surface of the shell-like structural component.

Apart from a curvature in the direction of the fuselage cross-section, multi-arched, in particularly doubly-arched, structural components for aircraft fuselages also comprise a clear curvature across the aforesaid, namely in longitudinal direction of the fuselage, which curvature is, however, usually less pronounced. The present invention deals with the production of such special structural components. However, the construction components used for stiffening, which components include stringers, braces, clips, window frames and door frames, need not be installed in their cured state with the device described in this document. The use of pre-formed construction components, so-called preforms, is also possible.

BACKGROUND OF THE INVENTION

DE 103 31 358 A1 describes a device of the type described above, which device in principle comprises a laminating bonding device and a jig that corresponds to the aforesaid. The jig essentially comprises a planar basic support to which a grid of a plurality of supporting walls of different lengths is affixed in such a manner that their distal ends, by way of modular profile components attached to the aforesaid, form a convex mounting surface, wherein spaces are used for the placement of stringers. In this arrangement the arched mounting surface essentially corresponds to the negative shape of the interior contour of the integral structural component to be produced. In each case the gap between adjacent modular profile components is arranged underneath the position of a stringer. Following complete assembly of the structural component and of the auxiliary materials on the jig, a suitable laminating bonding device is placed onto the jig above the aforesaid in order to finally form the structural component in a precisely-fitting manner.

At the beginning of the production process at first the mounting surface of the jig is covered by a foil. The hollow space formed by the receiving channels is subjected to a vacuum in such a manner that the foil is sucked along so as to rest smoothly against the mounting surface. Thereafter the roll of the foil is coupled to the roll of a vacuum skin in such a manner that the foil is rolled on, and the vacuum skin is unrolled onto the arched mounting surface and is drawn true to shape into the receiving channels of the stringers. Subsequently, stringers comprising support elements are placed into the receiving channels that are covered by the vacuum skin. Subsequently, all the skin layers comprising fiber composite materials are placed onto the exterior surface regions of the modular profiles and the stringers, which surface regions are covered by the vacuum skin. Optimized quantities of sealing compound are applied to the outermost skin layer, and subsequently a laminating bonding device that has been turned by 180° is put in place in a properly-fitting manner, which laminating bonding device compresses the all-round sealing compound in such a manner that a vacuum-tight seal between the vacuum skin and the laminating bonding device arises, and the cavities between the vacuum skin and the laminating bonding device are evacuated. When the intended process vacuum between the external skin and the laminating bonding device has been attained, the vacuum in the hollow space formed by the spaces is switched off, and access to the atmosphere is opened. Subsequently, the laminating bonding device with the structural component arranged therein after transfer from the jig is lifted, turned by 180°, and subjected to a subsequent injection process and curing process.

During separation of the laminating bonding device from the jig, as a result of the curvature of the structural component in conjunction with the stringers that extend longitudinally on the inside, so-called undercut problems occur relative to the associated receiving channels on the jig, which problems, depending on the degree of curvature of the structural component, might impede demolding as a result of a positive-locking fit that constitutes a hindrance. For this reason in this state of the art it is proposed to design the receiving channels for the stringers on the side of the jig in such a manner that no undercuts to the vertical result. However, this is associated with a disadvantage in that the degree of curvature of the structural component is severely limited by the feasibility of demolding as a result of the undercut problem. As a result of the undercut problem, in conventional jigs from a certain shell curvature onwards, the skin, which after transfer of the stringers onto a skin situated in the laminating bonding device, can no longer be moved from the laminating bonding device without in this process colliding with the stringers.

In order to solve this problem it has already been attempted to design parts of the modular profiles that form the arched mounting surface of the jig so that they are slidable in radial direction, and in this way, by moving-in the modular profiles situated in the undercut region, overcoming the undercuts that are present in that location. However, this technical solution involves considerable expense in implementing the mobility of the respective individual modular profiles of the arched mounting surface, which profiles are usually in the edge region of the aforesaid.

The three-dimensional curvature of a shell-like structural component renders the undercut problem more acute in the production principle of interest in the present document. Furthermore, as a result of the curvature, the effects of gravity when the usually very long and heavy jig is moved, undesirable outwards or inwards directed bulging or bending of the mounting surface of the jig can occur.

An aspect of the present invention relates to creating a device for the production of structural components that are multiply-arched over a large surface, which device with the use of simple technical means allows efficient automation and at the same time solves the undercut problem.

BRIEF SUMMARY OF THE INVENTION

An aspect of the present invention encompasses the technical teaching according to which the mounting surface of the jig comprises a plurality of window frames and door frames that in each case are elastically deformable, which window frames and door frames are arranged adjacent to each other along at least one longitudinally extending pitch line and which are attached to a plurality of elastically deformable supporting frame elements that extend on the interior of the shell across the pitch line. Consequently the mounting surface can be deformed by means of a plurality of actuators between an extended position A and at least one retracted position B in order to move the jig ARV from the laminating bonding device LKV relative to the receiving channels without undercuts.

The solution according to an aspect of the invention is advantageous, in particular, in that as a result of the division structure of the mounting shell in conjunction with the supporting frame elements that provide the required stiffness, a large-area, in particular doubly-arched, mounting surface of a jig can be presented which as a result of its shell division and shell bearing arrangement prevents undefined local deformation of the mounting surface. Within the context of the solution according to an aspect of the invention, at least one longitudinally extending division line exists. In this arrangement the individual mounting shell parts are mounted to the supporting frame elements by means of special connecting elements that fix each mounting shell part in the depth direction and in the transverse direction relative to the arched mounting surface at at least one point, while in longitudinal direction, which corresponds to the fuselage axis, being correspondingly freely-moving.

Depending on the extent of the surface of the structural component to be produced, a plurality of division lines may be necessary. In the case of, for example, a 5-shell design of the mounting surface, there are four division lines that are preferably arranged so as to be adjacent to each other. However, it is also imaginable to provide division lines that extend transversely. In symmetrically constructed structural components the division is arranged so as to be mirror-symmetrical relative to each mounting surface half in order to allow uniform deformation of the mounting surface between the extended position A and the retracted position B, according to an embodiment of the invention. As a rule, the more pronounced the three-dimensional structure of the structural component, the more prone to undefined local deformation is the mounting surface, and the more division lines are necessary to form the mounting surface of the jig. Thus, in the context of the present invention the number of mounting shell parts can vary. Likewise the number of receiving channels for placing construction components in particular stringers can vary for each mounting shell part. The individual mounting shell parts, which are connected by way of the elastically deformable supporting frame elements that form a type of transverse stiffening arrangement, are to be sealed, by way of a flexible skin, at the border regions of the division lines so as to create an uninterrupted mounting surface. The deformation of the mounting surface, designed in this manner, of the jig partly takes place by way of the supporting frame elements and partly by way of the mounting shell parts. In this arrangement the respective share of deformation can vary. The mounting surface designed according to an embodiment of the invention can be elastically deformed with the application of actuating forces to such an extent that the jig can be moved without collision right onto the shell skin situated in the laminating bonding device.

The construction components which, as a rule, are used to stiffen the structural component that is three-dimensionally arched over a large surface are in the form of stringers that can preferably be T-stringers or Q-stringers. As a rule, these stringers can be placed so as to be spaced apart from each other in longitudinally extending receiving channels of the mounting surface. In other words the receiving channels are essentially arranged in the direction of the fuselage length.

The mounting surface of the jig at least in part comprises mounting shell parts that comprise one or a plurality of receiving channels for stringers as construction components. Apart from this it is not mandatory for all the mounting shell parts to comprise receiving channels. Within the scope of the solution according to an aspect of the invention it is also imaginable for other construction components, such as window frames to form a cabin window, door frames, and the like, to be able to be placed into annular receiving channels made in the mounting surface. In the case of window frames, for example, on the edge of the mounting surface in each case a mounting shell part can be provided that features such annular receiving channels for window frames.

According to a special embodiment of the solution according to the invention it is proposed that each mounting shell part comprise a single allocated receiving channel, preferably for stringers. Consequently the individual mounting shell parts can be of quite a slim design, while a maximum of flexibility of the overall device is achieved. In principle in this special embodiment the number of mounting shell parts is determined by the number of construction components (stringers) to be integrated.

According to another measure of the invention, it is proposed that the actuators that are articulated on the inside to the mounting surface to the elastically deformable supporting frame elements be arranged spaced apart from each other along both opposing edge regions of the mounting shell. Such placement on the edge region of the mounting surface has been shown to be favorable for adjusting the mounting surface between the extended position A and the retracted position B. In this arrangement the longitudinal extension of the actuators are aligned so as to point radially inwards, and the actuators should be articulated in the interior to a stationary supporting structure. This results in space-saving external geometric dimensions of the jig. For example pneumatic cylinders or linear electrical drives can be used as actuators.

With the above-described special device for the production of structural components that are three-dimensionally arched over a large surface, said structural components can be produced in a simple manner in the sequence of the following method-related steps:

the mounting surface of the loaded and downwards-arched jig is deformed radially inwards by way of force acting on the supporting frame elements and is brought together with the corresponding laminating bonding device by being retracted, the mounting surface of the turned jig is deformed back in order to initiate construction component transfer, in particular of the stringers, to the laminating bonding device, and the mounting surface of the jig, which mounting surface is elastic by way of the mounting shell parts, is again deformed towards the interior in order to move the jig without undercuts from the laminating bonding device.

As a result of the sequence of these few method-related steps, high-quality arched structural components comprising fiber composite materials can be produced.

For preparation of the jig, according to some of the method-related steps preceding the main-method-related steps, it is proposed that:

the mounting surface of the jig, which mounting surface is in its upward-arched home position and is elastically deformed towards the inside, be loaded with the construction component and auxiliary materials, and then be turned over so that it attains a downward-arched operating position for subsequent insertion in the corresponding laminating bonding device.

In this manner the jig can easily be manually loaded with the construction components and the auxiliary materials.

BRIEF DESCRIPTION OF THE DRAWINGS

Below, further measures that improve the invention are presented in detail together with the description of two preferred exemplary embodiments of the device with reference to the figures.

The following are shown.

DETAILED DESCRIPTION

Figure 1:
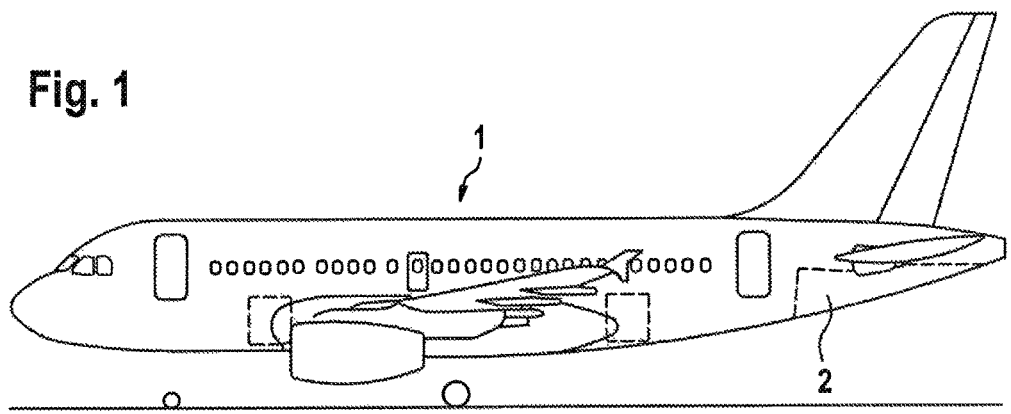
FIG. 1 a diagrammatic lateral view of an aircraft comprising a wide-body fuselage that comprises individual fuselage shells, FIG. 2*a* a diagrammatic view of a first embodiment of a jig with a deformable mounting surface, FIG. 2*b* a diagrammatic view of a second embodiment of a jig with a deformable mounting surface.

According to FIG. 1 the commercial aircraft shown comprises a wide-body fuselage which, produced in a shell construction, also comprises a rear three-dimensional, arched fuselage shell 2.

Figure 2A:
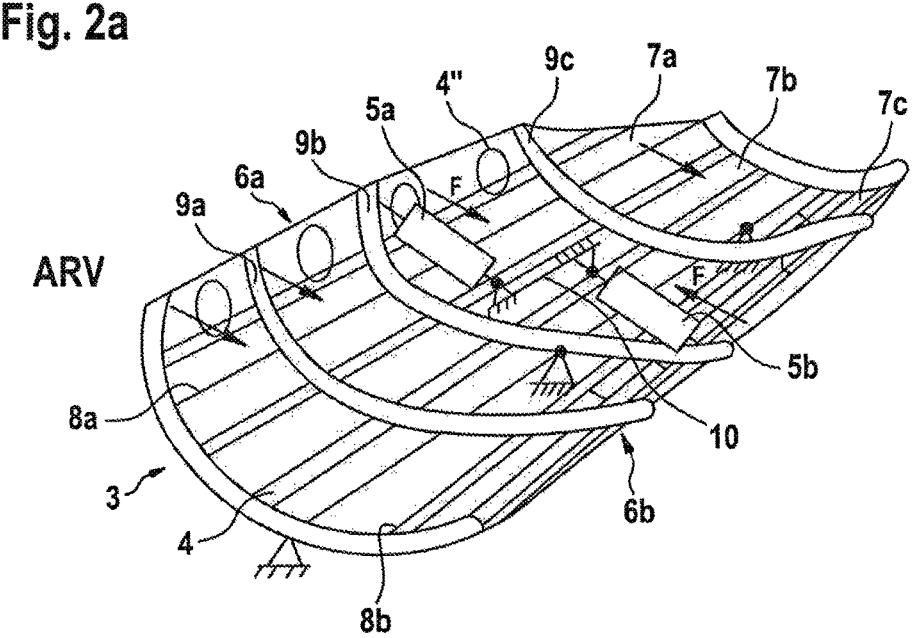

This structural component is made by means of a jig according to FIG. 2*a* that comprises an outwards-arched mounting surface 3. On the outside a plurality of receiving channels 4 arranged spaced apart from each other extend over the mounting surface 3 for inserting stringers as construction components, with the aforesaid together with the auxiliary materials to be applied to the mounting surface 3 at the end of the production process forming the three-dimensionally arched structural component.

The outwards-arched mounting surface 3, in the diagram arranged underneath the shown jig, at the edge can be elastically deformed inwards, as indicated by the two opposing rows of arrows. For this purpose a plurality of actuators 5*a*, 5*b* that are articulated to the inside are provided (as an example) in order to move the mounting surface 3 from the extended position shown in the diagram to a retracted position. Towards the middle, the actuators 5*a*, 5*b* are affixed to a shared supporting structure 10. In the retracted position, interaction without undercuts with a laminating bonding device (not shown in detail in the diagram) is possible. In order to implement this deformability, the mounting surface 3 comprises a plurality of elastically deformable mounting shell parts 7*a*-7*c* which, separated by two pitch lines 8*a* and 8*b*, form the entire mounting surface 3 of the jig. In this arrangement one pitch line 8*a* is situated between the mounting shell parts 7*a* and 7*b*, and the other pitch line 8*b* is situated between the mounting shell parts 7*b* and 7*c*. The three mounting shell parts 7*a*-7*c* are affixed (as an example) to a plurality of elastically deformable supporting frame elements 9*a* and 9*b* that extend transversely on the inside of the shell. The supporting frame elements 9*a* and 9*b* hold the three mounting shell parts 7*a*-7*c* in their desired position. The actuators 5*a* and 5*b* engage (as an example) the two ends of the supporting frame elements 9*a*-9*c* in order to in this manner cause the elastic deformation of the mounting surface 3.

Each mounting shell part 7*a*-7*c* comprises receiving channels 4 for stringers. Apart from this, the mounting shell parts 7*a* and 7*c* on the edge comprise annular receiving channels 4" for window frames.

Figure 2B:
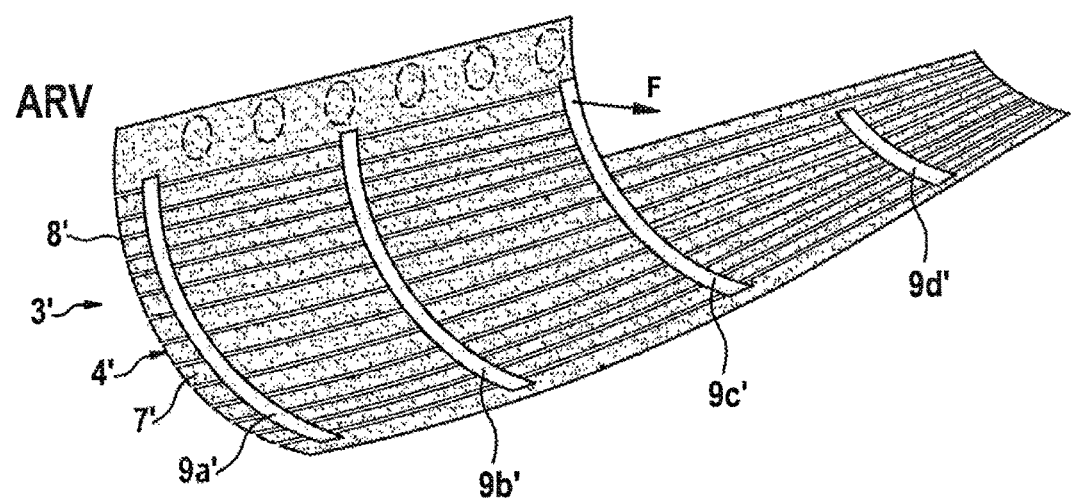

In the alternative embodiment, shown in FIG. 2*b*, of a jig each slim mounting shell part 7' comprises an associated receiving channel 4' so that a type of Viking plating of the supporting frame elements 9*a*'-9*d*' that form the mounting surface 3' results. A corresponding number of longitudinally extending pitch lines 8' exists. Otherwise this embodiment of the jig, in terms of the adjustment mechanism for moving between the extended position A and the retracted position B, corresponds to the embodiment described above.

Figure 3:
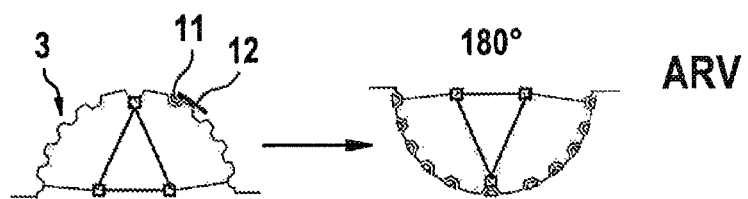
FIG. 3*a* first method-related step for the production of an arched structural component, FIG. 4*a* second method-related step for the production of an arched structural component, FIG. 5*a* third method-related step for the production of an arched structural component, and FIG. 6*a* fourth method-related step for the production of an arched structural component.

According to FIG. 3, for the production of the large-area essentially multiply-arched structural component with the aid of the above-described jig, the mounting shell 3, which is in the upwards-arched initial position, with stringers 11 and auxiliary materials 12 in the form of fiber mats and possibly further auxiliary materials such as positioning elements or pressure pieces are loaded. As shown in the diagram, the mounting shell 3, loaded in this manner, is then after evacuation turned over by 180° so that it attains a downward-arched operating position. As a result of the vacuum method, which is known per se, the stringers 8 with the auxiliary materials 12 remain attached to the mounting shell 3.

Figure 4:
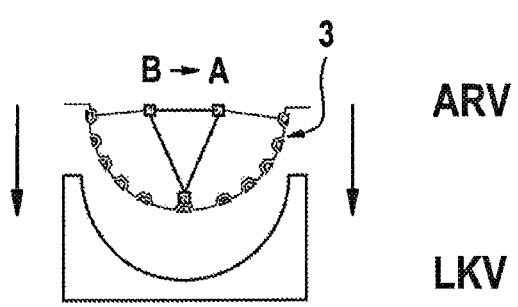

Subsequently, according to FIG. 4, the mounting shell 3 of the loaded and downwards-arched jig is deformed radially inwards into the retracted position B in order to move the aforesaid into a corresponding laminating bonding device positioned underneath this. In the retracted position the jig is transferred back to the extended position A. This is followed by the transfer of the stringers together with the auxiliary materials to the laminating bonding device. To this effect a vacuum is drawn on the side of the laminating bonding device, and ventilation takes place on the side of the jig.

Figure 5:
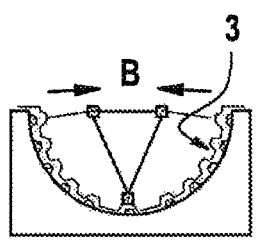
Figure 6:
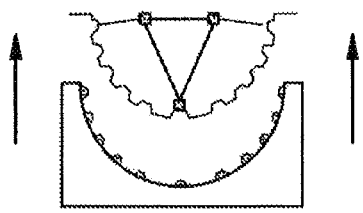

Thereafter, according to FIG. 5, the elastic mounting shell 3 of the turned jig is again deformed inwards until it attains the retracted position B, and lastly the jig is extended from the laminating bonding device without undercuts, as shown in FIG. 6.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Fuselage
2 Fuselage shell
3 Mounting surface
4 Receiving channel
5 Actuator
6 Edge region
7 Mounting shell part
8 Pitch line
9 Supporting frame element
10 Supporting structure
11 Stringer
12 Auxiliary material
ARV Jig
LKV Laminating bonding device
A Extended position of the jig
B Retracted position of the jig

The invention claimed is:

1. A device for the production of structural components from a fiber composite material, said structural components being three-dimensionally arched over a large surface, comprising:

a jig having a convex mounting surface comprising a plurality of receiving channels for the insertion of construction components and configured to be loaded with auxiliary materials, wherein the loaded jig is configured to interact with a laminating bonding device having a corresponding shape for forming the structural component under pressure, wherein the mounting surface further comprises a plurality of individually elastically deformable mounting shell parts arranged adjacent to each other along at least one longitudinally extending pitch line and attached to a plurality of elastically deformable supporting frame elements extending on the interior of the shell at a right angle to the pitch line, and a plurality of actuators configured to deform, by way of the supporting frame elements, the mounting surface between an extended position (A) and at least one retracted position (B) to move the jig from the laminating bonding device relative to the receiving channels without undercuts.

2. The device of claim 1, wherein the construction components are configured as stringers for stiffening the structural component, which stringers are configured to be inserted into the receiving channels, wherein the receiving channels are spaced apart from each other and extend longitudinally to each other.

3. The device of claim 2, wherein at least one of the mounting shell parts comprises a plurality of receiving channels for stringers as a construction component.

4. The device of claim 1, wherein each mounting shell part comprises an associated receiving channel.

5. The device of claim 1, wherein the construction components are configured as window frames to form a cabin window, which window frames are configured to be placed into corresponding annular receiving channels spaced apart from each other and arranged in a row, in the mounting surface.

6. The device of claim 1, wherein the actuators are articulated on the inside to the mounting surface to the elastically deformable supporting frame elements and are arranged spaced apart from each other along both opposing edge regions of the mounting surface.

7. The device of claim 6, wherein the longitudinal extension of the actuators is aligned so as to point radially inwards, and said actuators are articulated in the interior to a stationary supporting structure.

8. The device of claim 1, wherein the actuators comprise pneumatic cylinders or linear electrical drives.

9. The device of claim 1, wherein the mounting shell parts and the supporting frame elements holding the mounting shell parts together comprise a fiber composite material or an elastic sheet metal material.

* * * * *